April 29, 1952 R. M. FORD ET AL 2,594,898
ADJUSTABLE DEFINITE POSITION CLUTCH OPERATOR
Filed May 25, 1949 2 SHEETS—SHEET 1
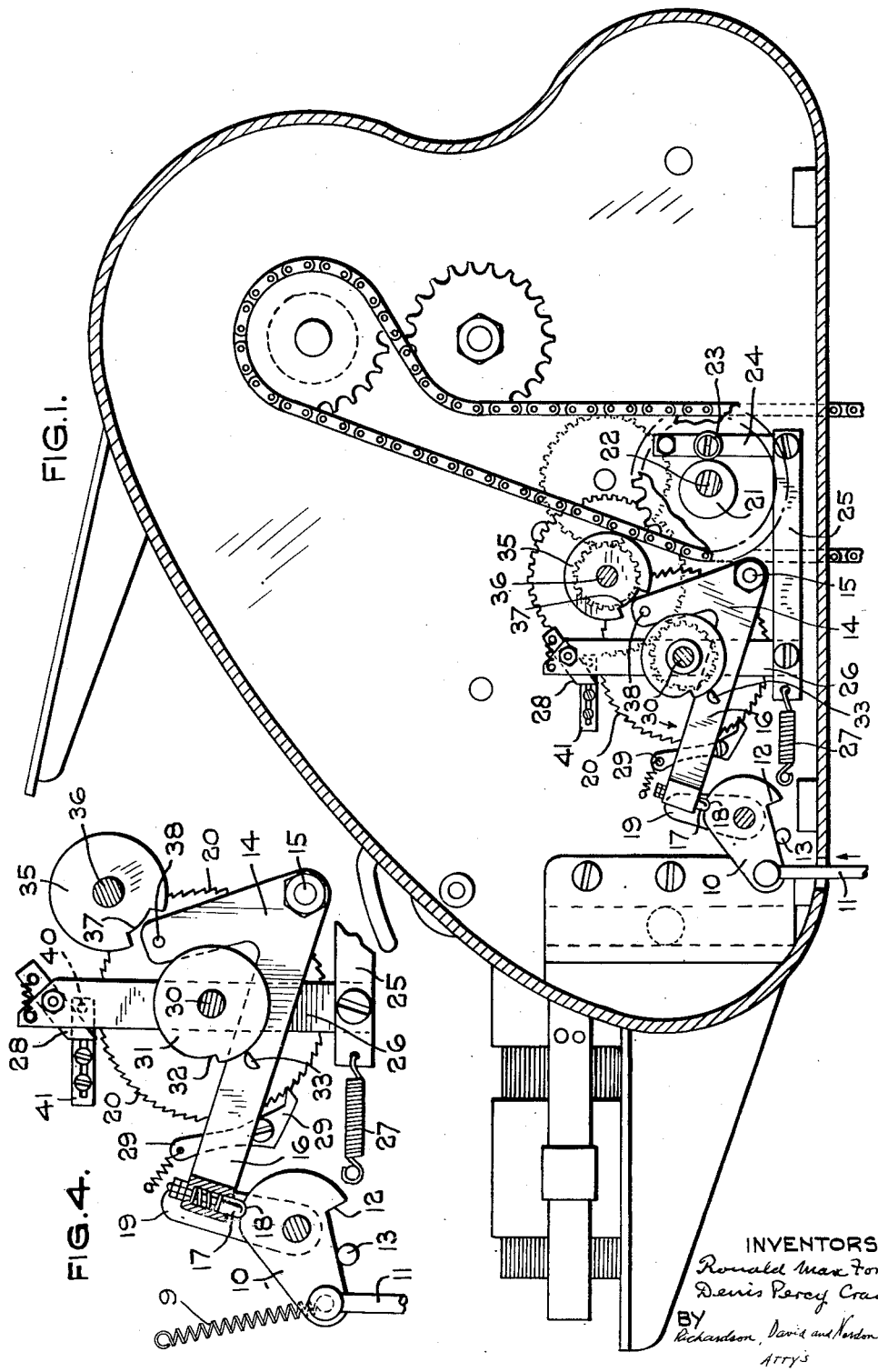
INVENTORS:
Ronald Max Ford
Denis Percy Crane
BY Richardson, Davis and Nordon
ATTYS April 29, 1952  R. M. FORD ET AL  2,594,898
ADJUSTABLE DEFINITE POSITION CLUTCH OPERATOR
Filed May 25, 1949  2 SHEETS—SHEET 2
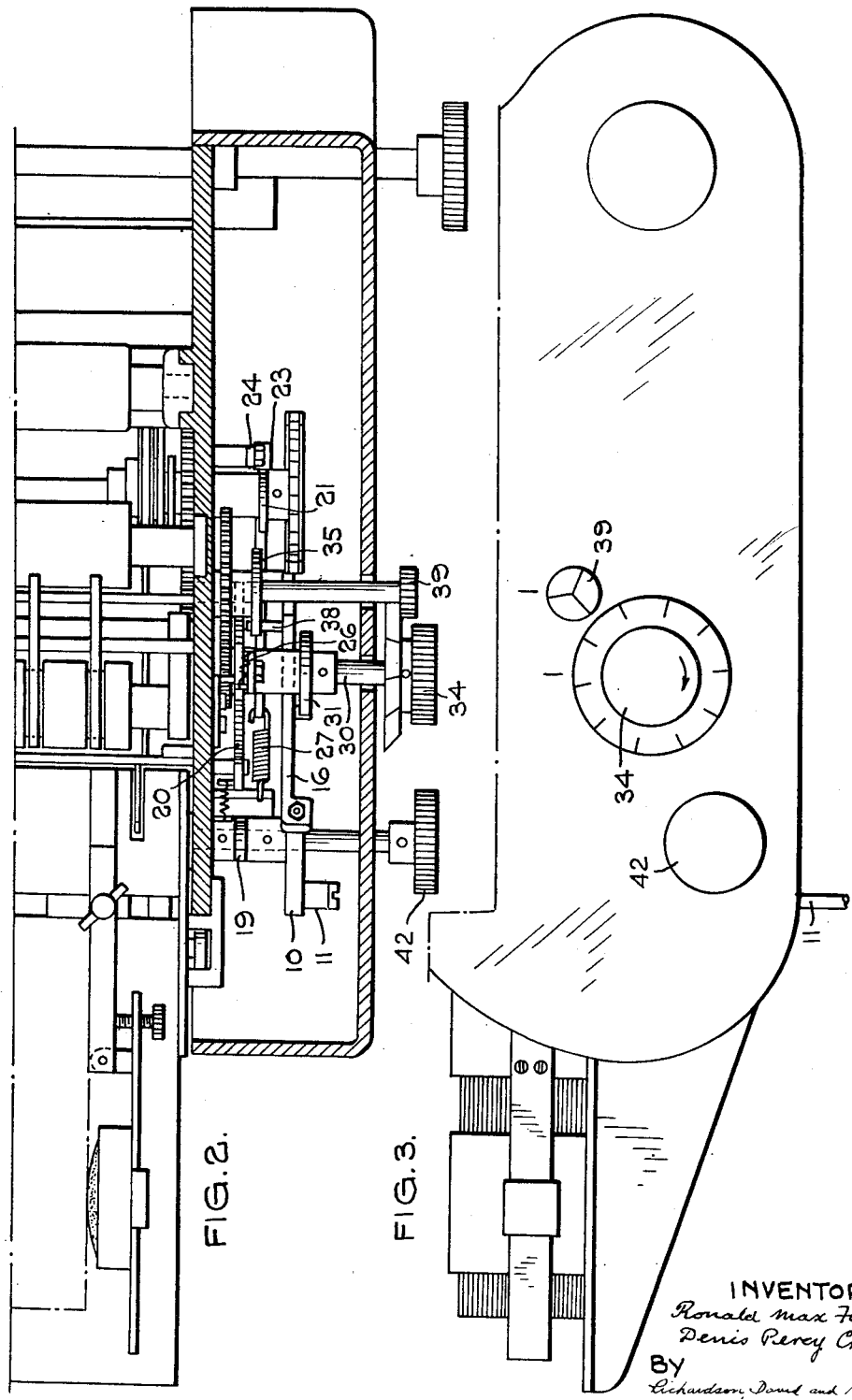

Patented Apr. 29, 1952

2,594,898

UNITED STATES PATENT OFFICE 2,594,898

ADJUSTABLE DEFINITE POSITION CLUTCH OPERATOR

Ronald Max Ford and Denis Percy Crane, Sparkbrook, Birmingham, England; said Crane assignor to Frank R. Ford Limited, Birmingham, England, a British company Application May 25, 1949, Serial No. 95,205
In Great Britain May 31, 1948

5 Claims. (Cl. 192—139)

This invention relates to machines in which printing is effected by passing copy sheets in pressure contact with a rotating cylinder and in which a driving shaft is driven by a power unit through the medium of a releasable clutch, and the invention has for its object to provide new or improved mechanism for disengaging the clutch automatically when a predetermined number of sheets have been printed.

The invention is, for instance, particularly applicable to duplicating machines of the kind in which a copy sheet and a master sheet bearing in reverse script the matter to be reproduced are passed in pressure contact between a cylinder to which the master sheet is clamped and a pressure roller, the copy sheet being moistened before being brought into contact with the master sheet.

According to the present invention the machine comprises a spring-loaded element for disengaging the clutch, this element being normally locked in the position it occupies when the clutch is in engagement by a spring-loaded retaining member, a rotary disc cooperating with this retaining member and having its periphery engaging a projection on the retaining member, and thus keeping the latter in its retaining position until a notch on the periphery of the disc moves into line with the projection, when the retaining member moves automatically into a released position, permitting the clutch to disengage by spring pressure, the disc being associated with and rotating with a ratchet wheel to which a step-by-step rotation is imparted by mechanism driven from the driving shaft of the machine.

The disc may be mounted concentrically with the ratchet wheel, or the disc may be mounted on a separate shaft driven by reduction gear from the ratchet wheel or from its shaft.

Two discs may be provided, one of which is concentric with the ratchet wheel and has a notch in its periphery for cooperating with a projection on the retaining member, and the seccing disc may also be provided with a notch in its periphery cooperating with a projection on another part of the retaining member, and the arrangement may be such that movement of the retaining member can be either controlled by the first disc or by the second disc which is rotating at a slower speed.

Preferably the disc, or both discs, can be set by hand to vary the position of its or their notch in relation to the projection or projections on the retaining member so as to vary the number of printing operations before the clutch is released.

The retaining member may be in the form of a spring-loaded lever.

Referring to the drawings:

Figure 1 is a side view of the machine showing details of the clutch release mechanism;

Figure 2 is a plan view;

Figure 3 is a side view with the cover in position; and

Figure 4 is a detail of the release mechanism.

In the construction shown the spring loaded element which controls the release of the clutch is in the form of a lever 10 fixed upon a shaft and acted upon by a spring 9 shown only in Figure 4 for clarity, to one end of which lever is pivoted a link 11 connected to the clutch. The clutch, which is not shown in the drawings and does not form part of the present invention, is of any suitable known kind used in rotary duplicating machines of this type and may, for example, be of the kind described in pending U. S. A. application, Serial No. 36,472 filed July 1st, 1948, in the name of Ronald Max Ford, one of the applicants herein, now Patent No. 2,586,460, issued February 19, 1942. The link 10 is connected to such clutch so that when it is moved up-wardly as seen in Figure 1 the clutch is disengaged.

The retaining member 14 which is provided for the lever 10 is a lever having two arms, the arms being arranged in diverging relationship and the lever being pivoted to the frame of the machine at the junction of the two arms at 15.

One arm 16 of the lever is provided with a projection 17 which is spring-loaded in an axial direction, and one end of this projection 17 is adapted to engage with a notch 18 in the lever element 10 which controls the disengagement of the clutch so as to lock this element 10 normally in the position it occupies when the clutch is engaged. If the lever forming the retaining member 14 is moved pivotally to bring its projection 17 out of the notch 18 in the element controlling the clutch, then the latter makes a turning movement under spring pressure and the clutch becomes disengaged instantly and automatically. The hand-operated knob 42 is provided on the shaft of the lever 10 which controls the clutch so that the clutch can be disengaged by hand at any time if required by turning the shaft.

The machine further incorporates a ratchet wheel 20 to which is imparted a step-by-step rotary motion. This motion may be produced by a cam 21 on the driving shaft 22 of the machine, this cam operating upon a roller 23 carried by a lever 24, which lever 24 is connected by a link 25 pivoted to one end of a lever 26 mounted concentrically with the ratchet wheel 20. A spring 27 is attached to this link, or to one of these levers, and the arrangement is such that the levers are rocked by the cam 21 in one direction, and the return movement in the opposite direction is produced by the spring 27.

The lever 26 which is pivoted concentrically with the ratchet wheel 20 carries a spring-loaded driving pawl 28 which is adapted to engage the ratchet teeth so that as this lever 26 is rocked it turns the ratchet wheel with a step-by-step motion.

There is also provided another spring-loaded pawl 29 which operates as a retaining pawl to prevent return motion of the ratchet wheel 20 during the return motion of the driving pawl 28. On the shaft which supports lever 10, there is mounted a lever 19 which is spring loaded by virtue of the spring 9, and which automatically puts the retaining pawl out of action by rocking it when the clutch has been released.

Mounted on the spindle 30 of the ratchet wheel 20, which also forms the pivotal axis of the rocking lever carrying the driving pawl, is a disc 31, this disc 31 having a notch 32 in its periphery which cooperates with a projection 33 on the arm 16 of the lever forming the retaining member. This disc 31 rotates with the ratchet wheel 20 until the notch 32 comes opposite to the projection 16 on the lever forming the retaining member when the latter is permitted to rock, its projection 33 moving into the notch 32, thus releasing the clutch-control lever 10 and allowing the clutch to move into the disengaged position.

The disc 31, which is concentric with the ratchet wheel 20 and which is provided with the notch in its periphery, can be turned by hand by control knob 34 so as to set the relationship between the notch 32 and the projection 33 on the retaining member. Thus, the mechanism may be set so as to release the clutch automatically after any predetermined number of operations of the machine.

When it is desired to provide for the release of the clutch after a number of operations greater than the number of ratchet teeth, a second disc 35 is provided on a separate but parallel shaft 36, and this disc 35 is also provided with a notch 37 in its periphery cooperating with a projection 38 on the second arm of the retaining lever 14. The spindle 36 of this disc 35 is adapted to be driven from the spindle 30 of the ratchet wheel 20 by reduction gear, and this second disc may also be turned by knob 39 so that its notch 37 can be set in relation to the projection 38 on the second arm of the retaining lever 14. When setting the discs the pawl 28 when moved back strikes a pin 40 on an adjustable plate 41 and is raised out of engagement.

When both discs are in operation the notch 32 in the first disc 31, which is concentric with the ratchet wheel, becomes ineffective because even when it comes into line with the projection 33 on the retaining lever the latter is not permitted to move because the projection 38 on its second arm is still engaging the periphery of the second disc 35. Copies up to one hundred can be set on control knob 34 and units of one hundred copies on knob 39.

A camshaft may be provided parallel to the axis of the ratchet wheel, and this camshaft may be driven through further reduction gear from a gearwheel on the shaft of the second disc, and a cam on this camshaft may be driven through a freewheel. This cam may be used for operating a lever which controls the upward movement of a table supporting a pile of copy sheets, as described in our copending application Serial No. 95,204, filed May 25, 1949.

What we claim then is:

1. In a duplicating machine wherein the copy sheets are passed in pressure contact with a rotating cylinder and having a driving shaft driven by a power unit through the medium of a releasable clutch, mechanism for disengaging the clutch automatically when a predetermined number of sheets have been printed comprising a spring-loaded element for disengaging the clutch; a spring-loaded retaining member for locking said element in position when the clutch is engaged; a projection on the retaining member; a rotary disc cooperating with the retaining member and having its periphery engaging said projection, said disc also having a notch on its periphery to allow the retaining member to move automatically into a released position when said notch is in line with said projection; a ratchet wheel mounted concentrically with said disc and rotating therewith; means for imparting a step-by-step rotation to said ratchet wheel from the driving shaft of the machine; a second rotary disc having a notch on its periphery and a second projection on the retaining member cooperating therewith, said second disc being rotated at less speed than the first-mentioned disc.

2. In a duplicating machine wherein the copy sheets are passed in pressure contact with a rotating cylinder and having a driving shaft driven by a power unit through the medium of a releasable clutch, mechanism for disengaging the clutch automatically when a predetermined number of sheets have been printed comprising a spring-loaded element for disengaging the clutch; a spring-loaded retaining member for locking said element in position when the clutch is engaged; a projection on the retaining member; a rotary disc cooperating with the retaining member and having its periphery engaging said projection, said disc also having a notch on its periphery to allow the retaining member to move automatically into a released position when said notch is in line with said projection; a ratchet wheel mounted concentrically with said disc and rotating therewith; means for imparting a step-by-step rotation to said ratchet wheel from the driving shaft of the machine; a second rotary disc having a notch on its periphery; a second projection on the retaining member cooperating therewith, said second disc being rotated at less speed than the first-mentioned disc; and separate hand control means for adjusting each disc to vary the position of its notch in relation to the cooperating projection on the retaining member so as to vary the number of printing operations before the clutch is released.

3. In a duplicating machine wherein the copy sheets are passed in pressure contact with a rotating cylinder and having a driving shaft driven by a power unit through the medium of a releasable clutch, mechanism for disengaging the clutch automatically when a predetermined number of sheets have been printed comprising, a member connected to the clutch for disengaging same, a pivotally mounted lever for actuating said member to disengage the clutch, a retaining member in the form of a pivotally mounted two-armed lever having a spring pressed projection on the end of one arm engaging a notch in said lever for locking said lever in position when the clutch is engaged, spring means acting on said lever to urge it in the direction for disengaging the clutch, a projection on one arm of the retaining member, a rotary disc co-operating with said arm and having its periphery engaging said projection, said disc having a notch in its periphery to allow the retaining member to move automatically into a released position when said notch is in line with said projection, a ratchet wheel associated with said disc and rotating therewith, means for imparting a step-by-step rotation to said ratchet wheel from the driving shaft of the machine, a second rotary disc having a notch on its periphery and a projection on the other arm of the retaining member co-operating therewith, said second disc being rotated at less speed than the first-mentioned disc.

4. In a duplicating machine wherein the copy sheets are passed in pressure contact with a rotating cylinder and having a driving shaft driven by a power unit through the medium of a releasable clutch, mechanism for disengaging the clutch automatically when a predetermined number of sheets have been printed comprising a spring-loaded element for disengaging the clutch; a spring-loaded retaining member for locking said element in position when the clutch is engaged; a projection on the retaining member; a rotary disc co-operating with the retaining member and having its periphery engaging said projection, said disc also having a notch on its periphery to allow the retaining member to move automatically into a released position when said notch is in line with said projection; a ratchet wheel mounted concentrically with said disc and rotating therewith; a cam mounted on the driving shaft of the machine, a roller carried by a pivotally mounted lever co-operating with said cam, a further pivotally mounted lever carrying a pawl engaging said ratchet wheel, a link connecting said two pivotally mounted levers so as to impart a step-by-step rotation to said ratchet wheel from the driving shaft of the machine; a second rotary disc having a notch on its periphery and a second projection on the retaining member co-operating therewith, gearing operatively connected between said first mentioned disc and said second disc so that said second disc is rotated at less speed than the first mentioned disc.

5. In a duplicating machine wherein the copy sheets are passed in pressure contact with a rotating cylinder and having a driving shaft driven by a power unit through the medium of a releasable clutch, mechanism for disengaging the clutch automatically when a predetermined number of sheets have been printed comprising a spring-loaded element for disengaging the clutch; a spring-loaded retaining member for locking said element in position when the clutch is engaged; a projection on the retaining member; a rotary disc co-operating with the retaining member and having its periphery engaging said projection, said disc also having a notch on its periphery to allow the retaining member to move automatically into a released position when said notch is in line with said projection; a ratchet wheel mounted concentrically with said disc and rotating therewith; a cam mounted on the driving shaft of the machine, a lever pivotally mounted about the axis of the ratchet wheel carrying a pawl engaging the ratchet wheel, means connected between said cam and said pivotally mounted lever so as to impart a step-by-step rotation to said ratchet wheel from the driving shaft of the machine; a second rotary disc having a notch on its periphery and a second projection on the retaining member co-operating therewith, gearing operatively connected between said first mentioned disc and said second disc so that said second disc is rotated at less speed than the first-mentioned disc.

RONALD MAX FORD.
DENIS PERCY CRANE.

REFERENCES CITED

The following references are of record in the file of this patent:

UNITED STATES PATENTS

| Number | Name | Date |
|---|---|---|
| 1,297,690 | Hough | Mar. 18, 1919 |
| 1,549,963 | Beyerlein | Aug. 18, 1925 |
| 1,710,298 | Daly | Apr. 23, 1929 |
| 2,018,964 | Lindon | Oct. 29, 1935 |
| 2,381,545 | Kirby | Aug. 7, 1945 |
| 2,391,470 | May | Dec. 25, 1945 |